(12) United States Patent
Speagle

(10) Patent No.: US 10,743,682 B2
(45) Date of Patent: Aug. 18, 2020

(54) TRANSACTION STAND

(71) Applicant: Walmart Apollo, LLC, Bentonville, AR (US)

(72) Inventor: Joe Speagle, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/379,696

(22) Filed: Apr. 9, 2019

(65) Prior Publication Data

US 2019/0335924 A1  Nov. 7, 2019

Related U.S. Application Data

(60) Provisional application No. 62/666,091, filed on May 2, 2018.

(51) Int. Cl.

| | |
|---|---|
| *A47F 9/04* | (2006.01) |
| *F16M 13/00* | (2006.01) |
| *A47F 5/00* | (2006.01) |
| *F16M 11/20* | (2006.01) |
| *F16M 11/10* | (2006.01) |
| *F16M 13/02* | (2006.01) |
| *F16M 11/04* | (2006.01) |

(52) U.S. Cl.
CPC ............ *A47F 9/04* (2013.01); *F16M 13/022* (2013.01); *A47B 2200/0042* (2013.01); *A47F 2009/041* (2013.01); *F16M 11/043* (2013.01); *F16M 11/20* (2013.01); *F16M 2200/024* (2013.01)

(58) Field of Classification Search
CPC .... F16M 13/00; F16M 11/00; F16M 2200/00; F16M 13/022; F16M 11/20; F16M 11/10; F16M 11/043; A47F 9/04; A47F 2009/041; A47B 2200/0042
See application file for complete search history.

(56) References Cited

U.S. PATENT DOCUMENTS

| | | | |
|---|---|---|---|
| 4,225,105 A | 9/1980 | Nakamura | |
| 4,478,382 A | 10/1984 | Carrier | |
| 4,620,701 A * | 11/1986 | Mojden | A63B 3/00 482/142 |
| 5,751,548 A | 5/1998 | Hall et al. | |
| 6,024,335 A | 2/2000 | Min | |
| (Continued) | | | |

FOREIGN PATENT DOCUMENTS

WO   2015145179 A1   10/2015

OTHER PUBLICATIONS

Unknown, "Universal Tablet Mount with Theft Resistant Fastener", ICW Solid Support, Nov. 10, 2015, 2 pages.

(Continued)

*Primary Examiner* — Tan Le

(57) ABSTRACT

Disclosed herein are aspects of a transaction device stand. In one embodiment, the transaction device stand comprises a stand base having a base plate, a column having a shape, and a winged collar latching mechanism. A swivel top may be mounted to the stand base via the winged collar, the swivel top configured to be physically coupled to a transaction device. A tension mechanism may be implemented between a portion of the swivel top and a portion of the winged collar of the stand base such that the swivel top is held at a position relative to the stand base in tension.

16 Claims, 5 Drawing Sheets

(56) References Cited

U.S. PATENT DOCUMENTS

| | | | |
|---|---|---|---|
| 6,357,712 B1 | 3/2002 | Lu | |
| 6,694,891 B1 * | 2/2004 | Lai | A47B 3/0818 108/116 |
| 7,303,171 B1 * | 12/2007 | Chen | B60R 11/00 224/908 |
| 7,641,162 B2 * | 1/2010 | Tsay | F16M 11/043 248/284.1 |
| 8,704,960 B2 | 4/2014 | Weaver | |
| 9,163,779 B2 | 10/2015 | Funk et al. | |
| 9,558,482 B2 | 1/2017 | Hicks et al. | |
| 9,907,416 B1 * | 3/2018 | Taylor | F16M 13/022 |
| 2005/0213298 A1 | 9/2005 | Doherty et al. | |
| 2008/0042020 A1 | 2/2008 | Laitila et al. | |
| 2008/0073472 A1 | 3/2008 | Chih | |
| 2012/0241567 A1 | 9/2012 | Gillespie-Brown et al. | |
| 2013/0087666 A1 | 4/2013 | Chien et al. | |
| 2013/0301216 A1 | 11/2013 | Trinh et al. | |
| 2017/0107742 A1 | 4/2017 | Moock et al. | |
| 2017/0311737 A1 | 11/2017 | Law et al. | |

OTHER PUBLICATIONS

Unknown, "Miura POSzle Kit-Stand, Printer and Hub", Pos-Hardware Ltd., https://www.mposhardware.co.uk/collections/miura-systems/products/muira-poszle-kit-stand-printer-and-hub, captured Mar. 22, 2018, 4 pages.

Unknown, "Best iPhone 5s/5/SE Bike Mounts: Take Your iPhone on Your Bike Tours", iGeeks Blog, https://www.geeksblog.com/best-iphone-5s-5-bike-mounts/, captured Mar. 22, 2018, pp. 1-23.

Unknown, Tablet Car Mount, DigiMo Windshield Holder or Dash Car Tablet Mount Holder for ZTE Zpad w/Anti-Vibration 3M Pedestal & Swivel Cradle (use with or without case), DIGITLMOBILEinc, http://www.digitlmobileinc.com/productdetail.asp?entryid=295902, captured Mar. 22, 2018, 1 page.

Young, Lee W., "International Search Report", International Application No. PCT/US2019/26663, dated Jul. 5, 2019, 3 pages.

Young, Lee W., "Written Opinion", International Application No. PCT/US2019/26663, dated Jul. 5, 2019, 8 pages.

\* cited by examiner

TRANSACTION STAND

BACKGROUND

In retail and commercial locations, a user may use a transaction device to pay for goods, complete a banking transaction, and various other transactions. The transaction device may be mounted as part of a point-of-sale (POS) device. In one example, the transaction device may include a payment device, such as a card reader, and may in some examples include a user interface, such as a monitor or keypad. The transaction device may need to be accessed by users of all physical sizes and positions and as such, the setting or position of the transaction device may be difficult to anticipate. Accordingly, what is needed is a transaction stand that enables a transaction device to be adjustable to accommodate various positions.

SUMMARY

In one aspect, the disclosure provides a transaction stand for receiving a transaction device. In one embodiment, a transaction stand includes a stand base, the stand base having a base plate, a column having a shape, and a winged collar. A swivel top may mount to the stand base via the winged collar and may be configured to be physically coupled to a transaction device. A tension mechanism may be implemented between a portion of the swivel top and a portion of the winged collar of the stand base such that the swivel top is held at a position relative to the stand base in tension.

In another aspect, the disclosure provides a transaction stand system. In one embodiment, the transaction stand system includes a stand base. The stand may comprise a base plate, a column having a shape, and a winged collar. The winged collar, in one embodiment, may include a collar body configured to complement the shape of the column such that the collar body substantially conforms to the outer portion of the upper portion of the column relative to the base plate disposed at the lower portion of the column, and a right wing portion and a left wing portion, the right wing portion and the left wing portion each disposed on opposite sides of the collar body relative to each other, the right wing portion and the left wing portion configured with the collar body as a single continuous component. A swivel top may be mounted to the stand base via the winged collar, the swivel top configured to be physically coupled to a transaction device. The swivel top may also include a main body portion configured with an opening substantially in a middle of the main body portion such that the opening at least partly aligns with the substantially hollow opening of the column upon securing the swivel top to the stand base; a right flap portion; and a left flap portion, the right flap portion and the left flap portion each disposed on opposite sides of the main body portion relative to each other, the right flap portion configured to substantially align along a parallel plane with the right wing portion of the winged collar and the left flap portion configured to substantially align along a parallel plane with the left wing portion of the winged collar upon securing the swivel top to the stand base. A tension mechanism may be implemented between the right and the left flap portions of the swivel top and the right and the left wing portions of the winged collar of the stand base such that the swivel top is held at a position relative to the stand base in tension.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

A transaction device at a POS fixture may be accessed by persons of varying height and position and as such, is preferably adjustable. Previous transaction stands have provided no adjustment, or only some manual adjustment, which caused wear and tear on movable parts and fixtures and required frequent maintenance. The principles of the disclosure provide aspects of a transaction stand having a tension mechanism enabling adjustment of a transaction device without a user manually adjusting a pin, bolt, or similar fastener. In some embodiments, the tension mechanism may be a spring and a user may manipulate the transaction device with little pressure and the transaction stand may adjust to and hold the swivel top in various positions relative to the stand base in tension.

Embodiments shown and described herein may enable POS fixtures and transaction stand systems to be used for longer lengths of time without maintenance or service required than previous transaction stands and POS fixtures that required manual adjustment to adjust positioning of the transaction device. Accordingly, less maintenance and service translate into fewer amounts of time when the POS fixture and transaction device is out of service, which provides an easier and more convenient experience for users, such as customers of a retail or commercial establishment. Likewise, the retail or commercial establishment may improve productivity of its employees due to less time required for maintenance or repair of POS fixtures.

Referring to the figures, examples of the disclosure enable a transaction stand and transaction stand system.

Figure 1:
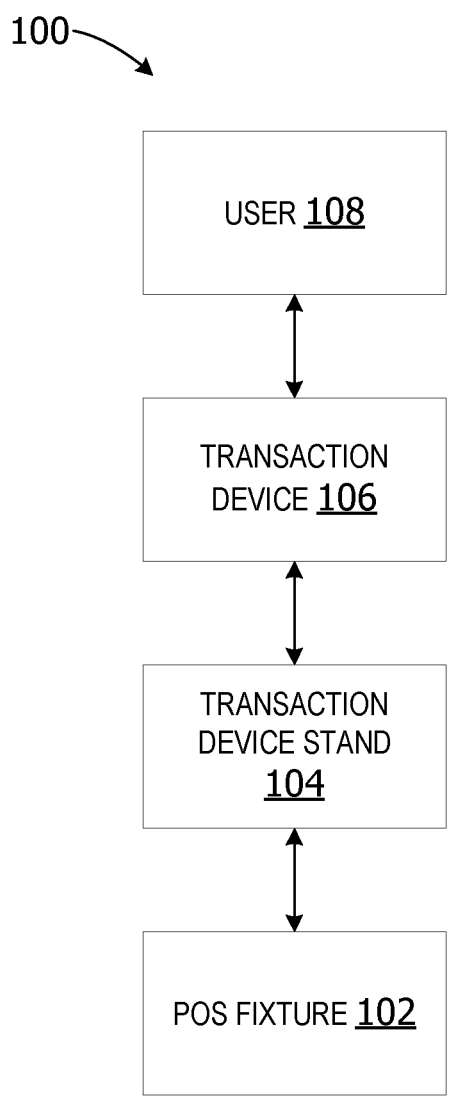
FIG. 1 is an exemplary block diagram illustrating a transaction stand system according to principles of the disclosure.

Referring now to FIG. 1, there is shown a transaction stand system 100. A Point-of-sale (POS) fixture 102 in a location has a transaction device stand 104 mounted thereto. The transaction device stand 104 is configured to receive a transaction device 106 therein, the transaction device 106 configurable for interaction with a user 108. If user 108 desires to adjust the position of the transaction device 106, the user 108 may move the transaction device 106 and a tension mechanism in the transaction device stand 104 adjusts the position of the transaction device stand 104 and accordingly adjusts the angle and height of the transaction device 106. This improves user comfort and convenience for user 108 when using the transaction device.

Figure 2:
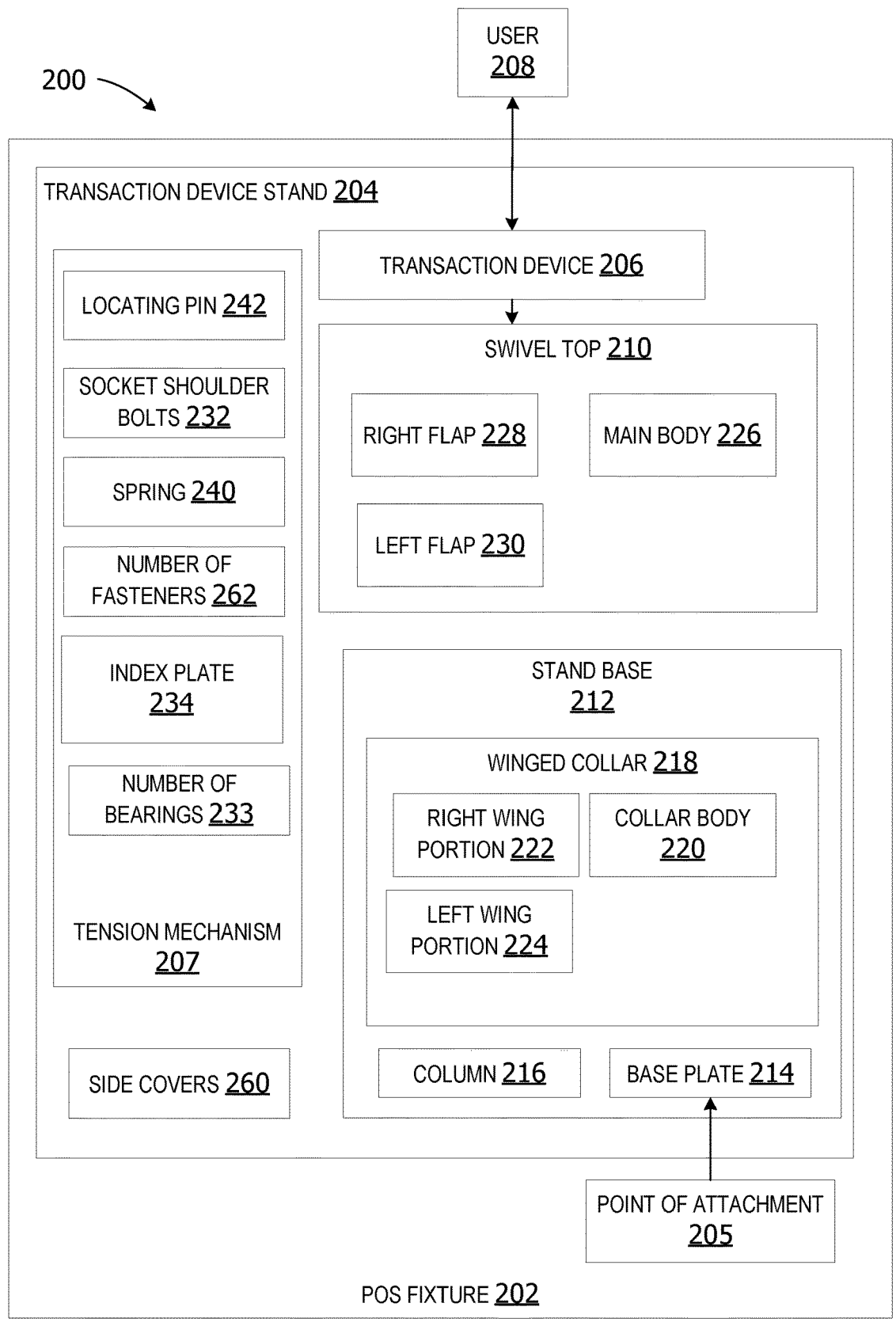
FIG. 2 is an exemplary block diagram illustrating one embodiment of a transaction stand system according to principles of the disclosure.

Referring now to FIG. 2, there is shown another embodiment of a transaction stand system 200 according to principles of the disclosure. The transaction stand system 200 includes a POS fixture 202 connected with a transaction device stand 204 via a point of attachment 205. The transaction device stand 204 is configured to receive a transaction device 206 therein. In one example, the transaction device 206 may be a card reader. In other examples, transaction devices may include other types of readers or any other user interface. A user 208 interacts with the transaction stand system 200 via the transaction device 206. The transaction device 206 is coupled with the transaction device stand 204 via a swivel top 210 near a top end of a stand base 212. The swivel top is configured to adjust to different positions relative to the stand base such that the user 208 can adjust the position of the transaction device 206.

The stand base 212 includes a base plate 214, a column 216, and a winged collar 218 atop the column 216. In some embodiments, the base plate 214 is configured to couple with the POS fixture 202 via point of attachment 205. The winged collar 218 may include a collar body 220 having a right wing portion 222 and a left wing portion 224 on opposing sides thereof. The swivel top 210 may include a main body 226 having a right flap 228 and a left flap 230 on opposing sides thereof. In some embodiments, the right flap 228 will couple with the right wing portion 222 of collar 218 and the and left flap 230 will couple with the left wing portion 224 of collar 218 via a plurality of socket shoulder bolts 232. In one embodiment, an index plate 234 is positioned between the left flap 230 and left wing portion 224, the index plate 234 having a plurality of positioning holes, corresponding to holes on the left wing portion 224, together forming a plurality of positioning point pairs for receiving a locating pin 242 therein.

Transaction device stand 204 includes tension mechanism 207. Tension mechanism 207 may include locating pin 242, socket shoulder bolts 232, spring 240, number of fasteners 262, index plate 234, and like components. In one embodiment a tension mechanism 207 includes a spring 240 mounted between the right wing portion 222 and the right flap 228 such that swivel top 210 is held at a position relative to the stand base 212 in tension. The swivel top 210 may include side covers 260 that attach to the stand base 212 via a plurality of fasteners 262.

Figure 3:
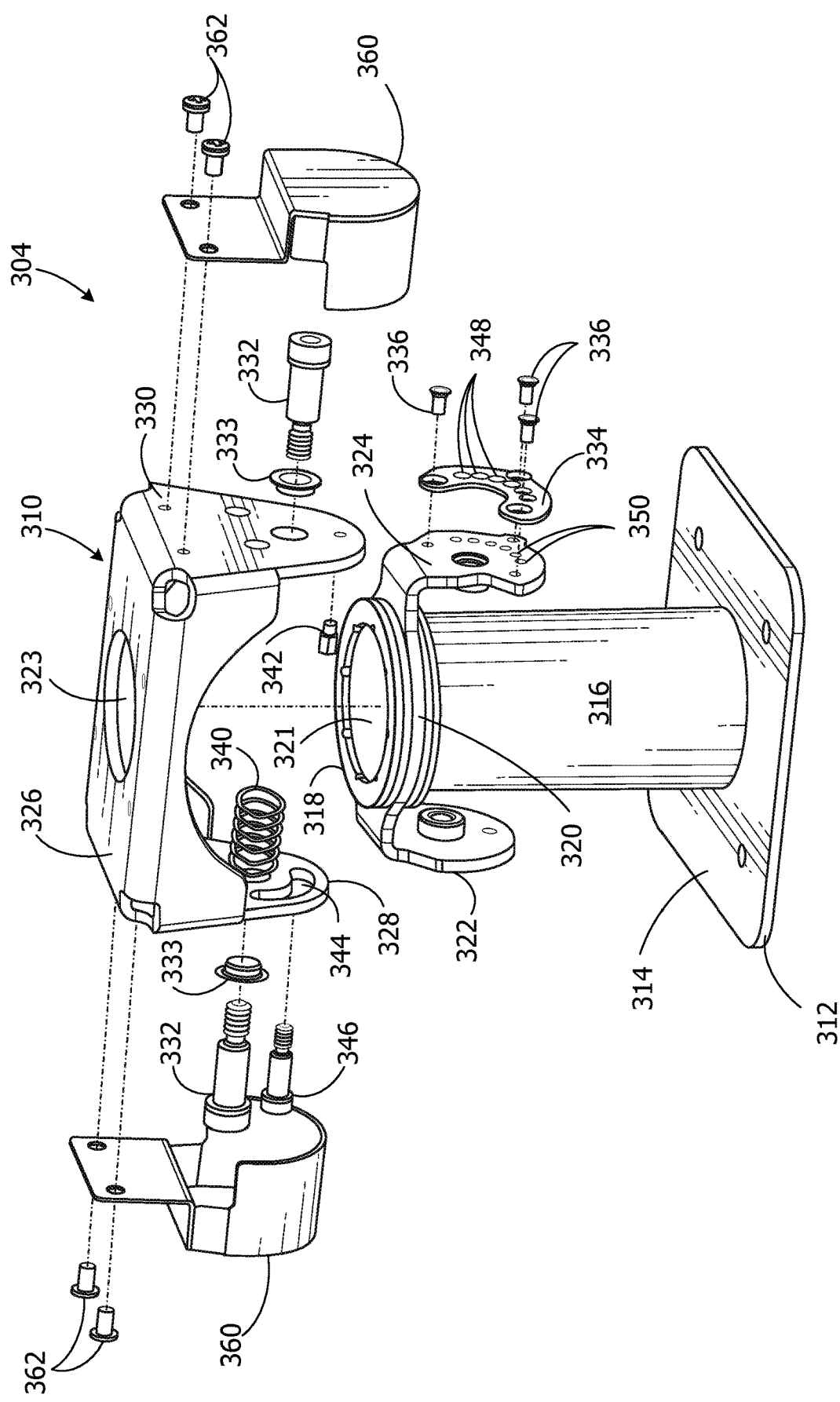
FIG. 3 is a front exploded view of one embodiment of a transaction stand according to principles of the disclosure.
Figure 4:
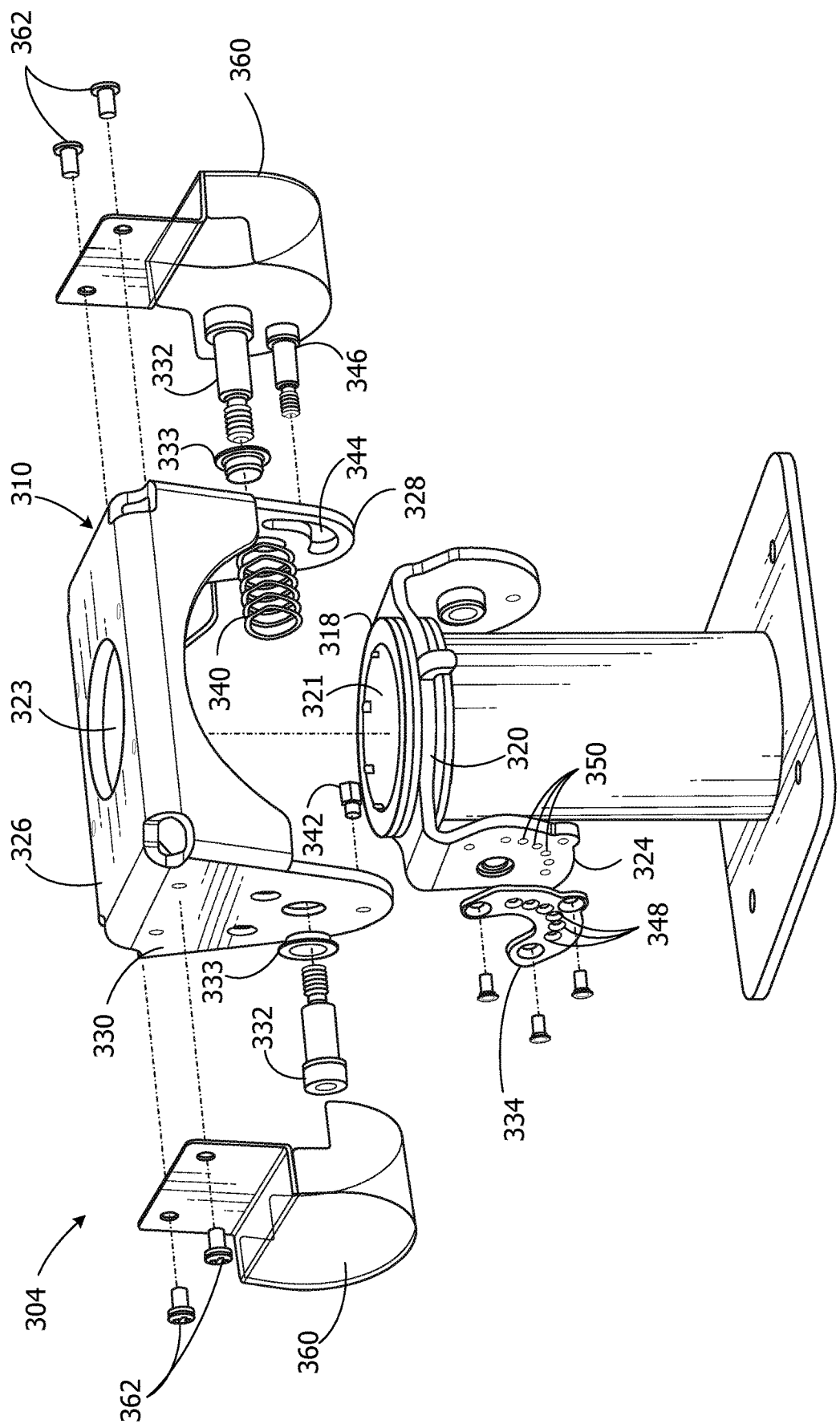
FIG. 4 is a back exploded view of one embodiment of a transaction stand according to principles of the disclosure.

Referring now to FIGS. 3 and 4. In FIG. 3 there is shown a front exploded view of a transaction device stand 304 and FIG. 4 is a back exploded view of the transaction device stand 304. The transaction device stand 304 includes a base 312, the base 312 having a base plate 314 with a column 316 extending upward therefrom. Near an upper portion of the column 316, relative to base plate 314, is a winged collar 318. The winged collar 318 has a collar body 320 which surrounds the upper portion of column 316. In one embodiment the winged collar 318 is configured to complement the shape of the column 316 such that collar body 320 substantially conforms to an outer portion of the upper portion circumference of the column 316, relative to the base plate 312 disposed at a lower portion of the column 316. In another embodiment the column 316 has a generally annular shape and the winged collar 318 has a complementary annular shape.

The collar body 320 has a right wing portion 322 and a left wing portion 324 on opposing sides thereof. The transaction device stand 304 also includes a swivel top 310 which couples to the winged collar 318. The swivel top 310 receives a transaction device thereon and enables the transaction device to swivel between different positions. In some embodiments, the winged collar 318 has an opening 321 substantially at the center thereof such that the opening 321 aligns with a substantially hollow opening of the column 316. The swivel top 310 has a similar opening 323 substantially near the center. In some embodiments, a portion of the transaction device, or connected components thereof (i.e. cabling), may extend into the openings 321 and 323 for fitting into or coupling with the swivel top 310. The swivel top 310 includes a main body 326 having at least a right flap 328 and left flap 330 on opposing sides thereof, the right flap 328 and left flap 330 configured to couple with the right wing portion 322 and left wing portion 324 of the winged collar 318.

An index plate 334 used for positioning the swivel top 310 may be positioned between the left flap 330 and the left wing portion 324 and is coupled onto left wing portion 324 via a plurality of fasteners 336. The index plate 334 has a plurality of positioning holes 348 therein which correspond to left wing positioning holes 350 in the left wing portion 324. In some embodiments, the positioning holes 348 and 350 may be countersunk holes for receiving a pin, such as locating pin 342, therein. Locating pin 342 may extend through an opening 344 near a bottom portion of left flap 330 and may be received into any of the positioning holes 348 and left wing positioning holes 350 to hold the swivel top into an adjusted position. A tension mechanism, in one embodiment, includes spring 340 positioned between the right flap 328 and right wing portion 322 and configured to compress such that the swivel top 310 may adjust to various positions as a user, such as user 108, exerts pressure on the transaction device to change the position of the transaction device. When the tension mechanism, via spring 340, is compressed, the swivel top 310 swivels in either a forward (downward angle) direction, or a backward (upward angle) direction relative to the user until the transaction device has reached a desired position. As the swivel top 310 swivels, the locating pin 342 is released from one pair of positioning holes 348 and 350 while the spring 340 is compressed. Once the desired position of the transaction device is achieved by the user, pressure is released from the spring 340 and the locating pin is received into the nearest pair of corresponding positioning holes 348 and 350 and held in position by tension from the uncompressed spring 340.

The swivel top 310 is coupled with the winged collar 318 via collar fasteners 332 and bearings 333, which in some embodiments, may be shoulder bolts and flange bearings, or similar fastening devices known to those skilled in the art. The collar fasteners 332 and bearing 333 extend through the swivel top 310 and into threaded openings in the winged collar 318, located on opposing sides, one in each of the right wing portion 322 and one in the left wing portion 324. In one embodiment, the tension device, spring 340, is positioned between the right flap 328 and the right wing portion 322. The spring 340 may be placed over and around the collar fastener 332 coupling the right flap 328 with right wing portion 322. A secondary fastener 346 is positioned below the spring 340 and extends through a channel opening 348 in the right flap 328 and is received into a threaded opening in the right wing portion 322. The channel opening 344 may be a curved, crescent, or similarly shaped opening to facilitate movement of the right flap 328 relative to the right wing portion 322 as the swivel top 310 moves between positions, in a similar manner and direction as the locating pin 342 is moving between pairs of positioning holes 348 and 350.

Side covers 360 are placed on opposing sides of the swivel top 310. The side covers 360 fasten to the right flap 328 and left flap 330 via cover fasteners 362 received into threaded openings 364 in the right flap 328 and left flap 330. The cover fasteners 362 may be screws or other suitable threaded fasteners known to those skilled in the art. The side covers 360 serve to both to substantially conceal the right flap 328 and left flap 330 and protect the features within the transaction device stand 304.

Figure 5:
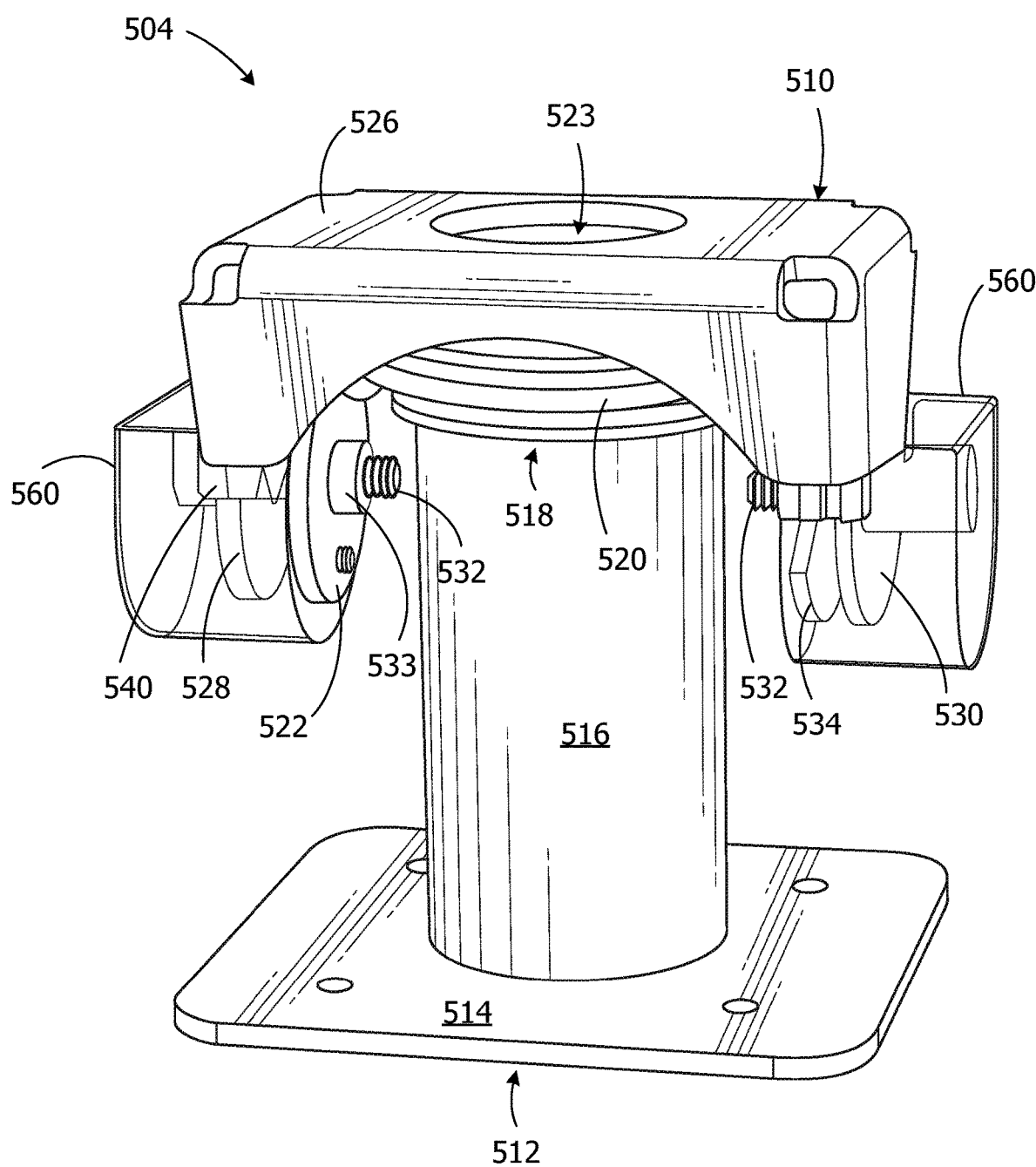
FIG. 5 is a perspective view of another embodiment of a transaction stand according to principles of the disclosure.

Referring now to FIG. 5, there is shown an assembled view of another embodiment of a transaction device stand 504 onto which a transaction device may be mounted. Transaction device stand 504 is similar to transaction device stand 304 shown in FIGS. 3 and 4 and includes similar features. Transaction device stand 504 includes a base 512 having a base plate 514, and a column 516 extending upward from the base plate 514. Near a top portion of the column 516 is a winged collar 518, the winged collar having a collar body 520 that surrounds the top portion of the column 516 and has a complimentary shape to the column 516. In some embodiments, the column 516 and collar body 520 may both have a substantially annular shape. On opposing sides of the collar body 520 are a right wing portion 522 and left wing portion 524 of winged collar 518 that extend downward toward the base plate 514.

Coupled to the winged collar 518 is a movable swivel top 510, which may be adjusted in various positions relative to the base 512. The swivel top 510 has a main body 526 having a right flap 528 and a left flap 530 on opposing sides thereof. The right flap 528 and left flap 530 extend downward and are configured to couple with the right wing portion 522 and left wing portion (not visible). Collar fasteners 532 and collar bearings 533, which in some embodiments may be shoulder bolts and flange bearings, fasten the swivel top 510 with the base 512.

A tension mechanism 540, which in one embodiment may be a wave spring, is positioned between right flap 528 and right wing portion 522 and may be positioned around the collar fastener 532 on that side. A locating pin (not shown) may be positioned on the opposing side of the winged collar 518 from the spring 540 of the tension mechanism and is configured to be received into pairs of corresponding positioning holes in both an index plate 534 and left wing portion 530, onto which the index plate 534 may be coupled. As a user applies pressure to a transaction device mounted on the stand 504, the spring 540 compresses thereby enabling the locating pin to move to a different set of positioning holes until a desired position of the transaction device is achieved by the user. When pressure is released, the locating pin 542 stays in one of the pairs of positioning holes and is maintained there by tension, maintaining the swivel top 510, and likewise the transaction device mounted thereto, in a fixed position.

As shown in FIG. 5, the swivel top 510 may comprise an opening 523 substantially near its center. There may be similar openings in the winged collar 518 and column 516. In some embodiments, the opening 523 may be configured to receive and hold the transaction device therein. In some embodiments, the opening may enable the transaction device stand 504 to accommodate various types and models of transaction device, with little or no modification or adjustments to the transaction device stand 504 or POS fixture. The transaction device stand 504 may therefore be a "universal" mounting stand.

Additional Examples

Alternatively, or in addition to the other examples described herein, examples include any combination of the following:

In one aspect, there is provided embodiments of a transaction stand. In one example, a transaction stand comprises a stand base comprising a base plate, a column having a shape, and a winged collar; a swivel top mounted to the stand base via the winged collar, the swivel top configured to be physically coupled to a transaction device; and a tension mechanism, the tension mechanism implemented between a portion of the swivel top and a portion of the winged collar of the stand base such that the swivel top is held at a position relative to the stand base in tension.

In another example, the winged collar may further include a collar body configured to complement the shape of the column such that the collar body substantially conforms to an outer portion of an upper portion of the column relative to the base plate disposed at a lower portion of the column.

In other examples, the winged collar may further include a right wing portion and a left wing portion, the right wing portion and the left wing portion each disposed on opposing sides of the collar body relative to each other, the right wing portion and the left wing portion configured with the collar body as a single continuous component, the right wing portion further configured as a tension plate, and the left wing portion further configured to accept an index plate. In yet another example, the transaction stand may include an index plate having a number of attachment holes configured to align with a number of other attachment holes of the left wing portion of the winged collar such that a number of fasteners inserted into the number of attachment holes and the number of other attachment holes upon alignment of the index plate with the left wing portion secure the index plate to the left wing portion of the winged collar. In yet another example, the transaction stand may include a locating pin; wherein the swivel top is further configured with a locating pin hole; and an index plate may have a number of insertion points configured to align with a number of other insertion points of the left wing portion of the winged collar to form insertion point pairs, such that upon insertion of the locating pin into an individual insertion point pair of the insertion point pairs the swivel top is secured at a given position.

In still other examples, the column of the base may be configured with a substantially hollow opening, wherein the base plate is configured with an opening substantially in a middle of a planar surface of the base plate, and wherein the opening of the base plate aligns with the substantially hollow opening of the column. The swivel top may further include a main body portion configured with an opening substantially in a middle of the main body portion such that the opening at least partly aligns with the substantially hollow opening of the column upon securing the swivel top to the stand base; a right flap portion; and a left flap portion, the right flap portion and the left flap portion each disposed on opposite sides of the main body portion relative to each other, the right flap portion configured to substantially align along a parallel plane with a right wing portion of the winged collar and the left flap portion configured to substantially align along a parallel plane with a left wing portion of the winged collar upon securing the swivel top to the stand base.

In yet another example, the transaction stand may include a set of side covers, the set of side covers including a right side cover and a left side cover, the set of side covers configured to be affixed to the right flap portion and the left flap portion of the swivel top such that the right flap portion and the left flap portion are substantially concealed.

In another example, the swivel top may further include a number of openings disposed along a surface of the right flap portion, one or more of the number of openings aligning with one or more openings of the right wing portion of the winged collar such that at least one fastener may secure the swivel top to the stand base via the one or more openings; and a number of other openings disposed along a surface of the left flap portion, one or more of the number of other openings aligning with one or more other openings of the left wing portion of the winged collar such that at least one fastener may secure the swivel top to the stand base via the one or more openings.

In some examples, the tension mechanism may comprise a spring on one side of the transaction stand; and a locating pin on an opposing side of the transaction stand, the locating pin configured for insertion to and removal from a number of insertion point pairs.

In another aspect, there may be disclosed a transaction stand system. In one example, the transaction stand system may include a stand base having a base plate; a column having a shape; and a winged collar, the winged collar including a collar body configured to complement the shape of the column such that the collar body substantially conforms to an outer portion of an upper portion of the column relative to the base plate disposed at a lower portion of the column, and a right wing portion and a left wing portion, the right wing portion and the left wing portion each disposed on opposing sides of the collar body relative to each other, the right wing portion and the left wing portion configured with the collar body as a single continuous component. The transaction stand system may further include a swivel top mounted to the stand base via the winged collar. The swivel top may be configured to be physically coupled to a transaction device and further including a main body portion configured with an opening substantially in a middle of the main body portion such that the opening at least partly aligns with the substantially hollow opening of the column upon securing the swivel top to the stand base. The swivel top may further include a right flap portion and a left flap portion, wherein the right flap portion and the left flap portion are disposed on opposite sides of the main body portion relative to each other, the right flap portion configured to substantially align along a parallel plane with the right wing portion of the winged collar and the left flap portion configured to substantially align along a parallel plane with the left wing portion of the winged collar upon securing the swivel top to the stand base. A tension may be implemented between the right and the left flap portions of the swivel top and the right and the left wing portions of the winged collar of the stand base such that the swivel top is held at a position relative to the stand base in tension.

In another example, the transaction stand system may further include an index plate having a number of attachment holes configured to align with a number of other attachment holes of the left wing portion of the winged collar such that a number of fasteners inserted into the number of attachment holes and the number of other attachment holes upon alignment of the index plate with the left wing portion secure the index plate to the left wing portion of the winged collar.

In yet another example, the transaction stand system may further include a locating pin; the left flap portion of the swivel top further configured with a locating pin hole; and the index plate having a number of insertion points configured to align with a number of other insertion points of the left wing portion of the winged collar to form insertion point pairs, such that upon insertion of the locating pin into an individual insertion point pair of the insertion point pairs the swivel top is secured at a given position.

In yet another example, the column may be configured with a substantially hollow opening, wherein the base plate is configured with an opening substantially in a middle of a planar surface of the base plate, and wherein the opening of the base plate aligns with the substantially hollow opening of the column.

In still another example, the transaction stand system may further include a set of side covers, the set of side covers including a right side cover and a left side cover, the set of side covers configured to be affixed to the right flap portion and the left flap portion of the swivel top such that the right flap portion and the left flap portion are substantially concealed.

In another example, the swivel top may include a number of openings disposed along a surface of the right flap portion, one or more of the number of openings aligning with one or more openings of the right wing portion of the winged collar such that at least one fastener may secure the swivel top to the stand base via the one or more openings; and a number of other openings disposed along a surface of the left flap portion, one or more of the number of other openings aligning with one or more other openings of the left wing portion of the winged collar such that at least one fastener may secure the swivel top to the stand base via the one or more openings.

In yet another example, the tension mechanism may comprise at least a spring and a locating pin, the locating pin configured for insertion to and removal from a number of insertion point pairs.

At least a portion of the functionality of the various elements in the figures may be performed by other elements in the figures, or an entity (e.g., processor, web service, server, application program, computing device, etc.) not shown in the figures.

While the aspects of the disclosure have been described in terms of various examples with their associated operations, a person skilled in the art would appreciate that a combination of operations from any number of different examples is also within scope of the aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A device stand comprising:
   a stand base comprising a base plate, a substantially hollow column affixed to the base plate, and a winged collar disposed at an opposite end of the substantially hollow column from the base plate;
   a swivel top mounted to the stand base via the winged collar, the swivel top configured to be physically coupled to a device; and a tension mechanism, the tension mechanism implemented between a portion of the swivel top and a portion of the winged collar of the stand base such that the swivel top is held at a position relative to the stand base in tension, the tension mechanism further comprising:
a spring; and
a locating pin disposed opposite to the spring relative to opposing sides of the swivel top, the locating pin configured for removal from and insertion to a number of insertion point pairs upon compression and decompression of the spring.

2. A device stand of claim 1 wherein the winged collar further comprises:
a collar body configured to complement a shape of the substantially hollow column such that the collar body substantially conforms to an outer portion of an upper portion of the substantially hollow column relative to the base plate disposed at a lower portion of the column.

3. A device stand of claim 1, wherein the winged collar further comprises:
a right wing portion and a left wing portion, the right wing portion and the left wing portion each disposed on opposing sides of the collar body relative to each other, the right wing portion and the left wing portion configured with the collar body as a single continuous component, the right wing portion further configured as a tension plate opposed to the spring, and the left wing portion further configured to accept an index plate, the index plate and the left wing portion together providing the number of insertion point pairs for the locating pin.

4. A device stand of claim 3, further comprising:
the index plate having a number of attachment holes configured to align with a number of other attachment holes of the left wing portion of the winged collar such that a number of fasteners inserted into the number of attachment holes and the number of other attachment holes upon alignment of the index plate with the left wing portion secure the index plate to the left wing portion of the winged collar.

5. A device stand of claim 3, further comprising:
the swivel top further configured with a locating pin hole; and
the index plate having a number of insertion points configured to align with a number of other insertion points of the left wing portion of the winged collar to form the number of insertion point pairs, such that upon insertion of the locating pin into an individual insertion point pair of the number of insertion point pairs responsive to decompression of the spring in tension against the tension plate of the right wing portion, the swivel top is secured at a given position.

6. A device stand of claim 1, wherein the base plate is configured with an opening substantially in a middle of a planar surface of the base plate to align with an opening of the substantially hollow column.

7. A device stand of claim 6, wherein the swivel top further comprises:
a main body portion configured with an opening substantially in a middle of the main body portion such that the opening at least partly aligns with the opening of the substantially hollow column upon securing the swivel top to the stand base;
a right flap portion; and
a left flap portion, the right flap portion and the left flap portion each disposed on opposite sides of the main body portion relative to each other, the right flap portion configured to substantially align along a parallel plane with a right wing portion of the winged collar and the left flap portion configured to substantially align along a parallel plane with a left wing portion of the winged collar upon securing the swivel top to the stand base.

8. A device stand of claim 7, further comprising:
a set of side covers, the set of side covers including a right side cover and a left side cover, the set of side covers configured to be affixed to the right flap portion and the left flap portion of the swivel top such that the right flap portion and the left flap portion are substantially concealed.

9. A device stand of claim 7, wherein the swivel top further comprises:
a number of openings disposed along a surface of the right flap portion, one or more of the number of openings aligning with one or more openings of the right wing portion of the winged collar such that at least one fastener may secure the swivel top to the stand base via the one or more openings; and
a number of other openings disposed along a surface of the left flap portion, one or more of the number of other openings aligning with one or more other openings of the left wing portion of the winged collar such that at least one fastener may secure the swivel top to the stand base via the one or more openings.

10. A device stand system comprising:
a stand base comprising:
a base plate;
a substantially hollow column affixed to the base plate; and
a winged collar disposed at an opposite end of the substantially hollow column from the base plate, the winged collar including a collar body configured to complement a shape of the substantially hollow column such that the collar body substantially conforms to an outer portion of an upper portion of the substantially hollow column relative to the base plate disposed at a lower portion of the column, the winged collar further including a right wing portion and a left wing portion, the right wing portion and the left wing portion each disposed on opposing sides of the collar body relative to each other, the right wing portion and the left wing portion configured with the collar body as a single continuous component;
a swivel top mounted to the stand base via the winged collar, the swivel top configured to be physically coupled to a device and further comprising:
a main body portion configured with an opening substantially in a middle of the main body portion such that the opening at least partly aligns with the opening of the substantially hollow column upon securing the swivel top to the stand base;
a right flap portion; and
a left flap portion, the right flap portion and the left flap portion each disposed on opposite sides of the main body portion relative to each other, the right flap portion configured to substantially align along a parallel plane with the right wing portion of the winged collar and the left flap portion configured to substantially align along a parallel plane with the left wing portion of the winged collar upon securing the swivel top to the stand base; and a tension mechanism, the tension mechanism implemented between the right and the left flap portions of the swivel top and the right and the left wing portions of the winged collar of the stand base such that the swivel top is held at a position relative to the stand base in tension, the tension mechanism further comprising:
  a spring; and
  a locating pin disposed opposite to the spring relative to opposing sides of the swivel top, the locating pin configured for removal from and insertion to a number of insertion point pairs upon compression and decompression of the spring.

11. A device stand system of claim 10, further comprising:
an index plate having a number of attachment holes configured to align with a number of other attachment holes of the left wing portion of the winged collar such that a number of fasteners inserted into the number of attachment holes and the number of other attachment holes upon alignment of the index plate with the left wing portion secure the index plate to the left wing portion of the winged collar, the index plate and the left wing portion together providing the number of insertion point pairs for the locating pin.

12. A device stand system of claim 11, further comprising:
the left flap portion of the swivel top further configured with a locating pin hole;
the right wing portion of the swivel top further configured as a tension plate opposed to the spring; and
the index plate having a number of insertion points configured to align with a number of other insertion points of the left wing portion of the winged collar to form the number of insertion point pairs responsive to decompression of the spring in tension against the tension plate of the right wing portion, such that upon insertion of the locating pin into an individual insertion point pair of the insertion point pairs the swivel top is secured at a given position.

13. A device stand system of claim 10, wherein the base plate is configured with an opening substantially in a middle of a planar surface of the base plate to align with an opening of the substantially hollow column.

14. A device stand system of claim 10, further comprising:
a set of side covers, the set of side covers including a right side cover and a left side cover, the set of side covers configured to be affixed to the right flap portion and the left flap portion of the swivel top such that the right flap portion and the left flap portion are substantially concealed.

15. A device stand system of claim 10, wherein the swivel top further comprises:
a number of openings disposed along a surface of the right flap portion, one or more of the number of openings aligning with one or more openings of the right wing portion of the winged collar such that at least one fastener may secure the swivel top to the stand base via the one or more openings; and
a number of other openings disposed along a surface of the left flap portion, one or more of the number of other openings aligning with one or more other openings of the left wing portion of the winged collar such that at least one fastener may secure the swivel top to the stand base via the one or more openings.

16. A device stand system of claim 10, wherein the spring is a wave spring.

* * * * *